(12) United States Patent
Todaka et al.

(10) Patent No.: US 7,240,529 B2
(45) Date of Patent: Jul. 10, 2007

(54) PARTIALLY REINFORCING METHOD AND APPARATUS OF METAL MATERIAL

(75) Inventors: Hirotaka Todaka, Aichi-ken (JP); Yoshiaki Kadoma, Okazaki (JP); Masataka Iida, Toyota (JP)

(73) Assignee: Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 10 days.

(21) Appl. No.: 10/782,759

(22) Filed: Feb. 23, 2004

(65) Prior Publication Data

US 2004/0211235 A1  Oct. 28, 2004

(30) Foreign Application Priority Data

Mar. 17, 2003  (JP) ............................. 2003-072152

(51) Int. Cl.
*B21D 1/02* (2006.01)
(52) U.S. Cl. ........................... 72/112; 72/67; 72/379.6; 72/414; 72/475
(58) Field of Classification Search .................. 72/67, 72/74, 75, 76, 112, 115, 125, 379.2, 379.6, 72/385, 412, 414, 415, 416, 474, 475; 148/645, 148/695, 696; 428/603, 604
See application file for complete search history.

(56) References Cited

U.S. PATENT DOCUMENTS

| | | | |
|---|---|---|---|
| 1,843,675 A | * | 2/1932 | Hosking ...................... 72/112 |
| 3,470,720 A | * | 10/1969 | Campbell et al. ............. 72/69 |
| 3,748,888 A | * | 7/1973 | Gerich ........................ 72/375 |
| 3,869,897 A | * | 3/1975 | Iida ............................. 72/125 |
| 4,489,585 A | * | 12/1984 | Palmer et al. ................ 72/387 |

(Continued)

FOREIGN PATENT DOCUMENTS

| | | |
|---|---|---|
| DE | 887 921 | 8/1953 |
| DE | 100 42 864 | 3/2002 |
| JP | 63-235037 | * 9/1988 |

(Continued)

OTHER PUBLICATIONS

Journal of the JSTO, "A High Distorsion Processing as a Method of Superrefining of Grains", vol. 44, No. 505 (Feb. 2002) along with an English Abstract.
German Office Action dated Nov. 25, 2005.

*Primary Examiner*—Ed Tolan
(74) *Attorney, Agent, or Firm*—Finnegan, Henderson, Farabow, Garrett & Dunner LLP

(57) ABSTRACT

The present invention intends to provide the partially reinforcing method and apparatus for reinforcing the required part of the metal material having good forming property and relatively low strength (hardness and yield stress) by the press processing.

The partial reinforcing method is comprised of a first step and a second step. The first press step generates a plastic strain by a plastic flow of metal material on a front surface and a rear surface of the part to be reinforced, to form a front convex-concave surface and a rear convex-concave surface. The second press step further generates the plastic strain by the plastic flow on the front convex-concave surface and the rear convex-concave surface, to form a front plane surface and a rear plane surface.

11 Claims, 7 Drawing Sheets

U.S. PATENT DOCUMENTS

| | | | | |
|---|---|---|---|---|
| 4,590,783 | A | * | 5/1986 | Tanaka et al. ............... 72/384 |
| 4,795,333 | A | * | 1/1989 | Standring ................... 425/78 |
| 5,262,123 | A | * | 11/1993 | Thomas et al. ............. 419/67 |
| 5,632,180 | A | * | 5/1997 | Doose ........................ 72/404 |
| 5,737,959 | A | * | 4/1998 | Korbel et al. ................ 72/362 |
| 5,953,950 | A | * | 9/1999 | Sasaoka et al. ............. 72/344 |
| 6,197,129 | B1 | * | 3/2001 | Zhu et al. ................... 148/400 |
| 6,502,447 | B2 | * | 1/2003 | Adams et al. ............... 72/326 |
| 7,080,438 | B2 | * | 7/2006 | Murakami ................... 29/428 |
| 2005/0081594 | A1 | * | 4/2005 | Segal ........................ 72/253.1 |

FOREIGN PATENT DOCUMENTS

| | | |
|---|---|---|
| JP | 02-089599 | 3/1990 |
| JP | 7-3427 | 1/1995 |
| JP | 08/033933 | 2/1996 |
| JP | 2002-241835 | 8/2002 |

* cited by examiner (1st Step)

(2nd Step)

Distance from Center (mm)

PARTIALLY REINFORCING METHOD AND APPARATUS OF METAL MATERIAL

BACKGROUND OF THE INVENTION

1. Field of the Invention

The present invention relates to a partially reinforcing method and apparatus of metal material for reinforcing a part of metal material.

2. Description of the Related Art

In general, selecting a material of a formed body, the material having hardness or yield strength satisfying the max value of a required strength is considered. Alternatively, a material which can be subjected to a heat treatment after a press-forming to reinforce the whole formed body is selected.

However, if the material is selected in view of strength of a part requiring the largest strength, following disadvantage may occur. The press-forming property of the material is lowered as a whole, and in the worst case, the material can not be formed. In addition, using the material having high strength is expensive and uneconomical, since even in the part not requiring the larger strength, the formed body has the thickness larger than the thickness naturally required.

On the other hand, there is a method in which a pressed formed body may be subjected to a heat treatment to increase the strength. In this case, the heat treatment process needs additional equipment and the step, so that the cost is increased.

As the reinforcing method of the limited part of the formed body, the part requiring the strength has been subjected to a shot blast processing after the press-forming, has been known. In addition, a method for increasing a plate thickness of the part requiring strength has been known (refer to Patent Publication No.1). For this purpose, the strength required part of a press-formed body made of steel is subjected to a flame spray to form a flame spray film. A strengthening method of a work by heating a part requiring the strength higher than other part and then quenched, has been known (refer to Patent Publication No.2).

By the way, to satisfy requirement of lightweight of a vehicle, thinning the constructing member, or forming the constructing member by a lightweight material such as the aluminum (aluminizing the constructing member) have been tried. For example, forming a suspension member or a frame member of a vehicle body which have been formed by the steel formed body is formed by the aluminum formed body for lightening (for light-weighting).

However, the hardness of the aluminum is smaller than that of the steel. For this reason, at the position where the suspension member formed by the aluminum alloy is contacted with the bushing attached to the lower arm and the upper arm, there is a fear that the slide surface of the suspension member may be worn due to sliding of a bushing, when the vehicle is running. To avoid such disadvantage, larger-size bushing is used to decrease the limitive surface pressure thereof, or the aluminum alloy of the larger strength has been used for the suspension member. These manners, however, increase of cost of the bushing and the suspension member, and lower of the forming property of the suspension member.

[Patent document 1] Japanese Patent Laid-open No.7-3427

[Patent document 2] Japanese Patent Laid-open No.2002-241835

BRIEF SUMMARY OF THE INVENTION

The present invention has been made in view of the above mentioned circumstances, and has an object to provide a partially reinforcing method and apparatus which can reinforce the predetermined part of the metal material requiring to be reinforced which is excellent in the forming property and which has relatively low strength (hardness and yield strength). The predetermined part can be reinforced by the pressing process.

The partially reinforcing method of the metal material according to the present invention is comprised of (i) a first press step for generating a plastic strain by a plastic flow of metal material on a front (upper) surface and/or a rear (lower) surface of the part to be reinforced, to form a front (upper) convex-concave surface and/or a rear (lower) convex-concave surface; and (ii) a second press step for further generating the plastic strain by the plastic flow on the front convex-concave surface and/or the rear convex-concave surface, to form a front (upper) plane surface and/or a rear (lower) plane surface.

In the second press step, static hydraulic pressure in the press direction is applied to the metal material, and the shear force in the plane direction is applied to the metal material simultaneously, to form the upper plane surface and the lower plane surface. The metal material is preferably an aluminum alloy, and preferably has thickness of 2 to 10 mm.

A shape of the press surface of the upper punch and lower punch used in the first pressing step are comprised of the annular convex portions and annular concave portions formed coaxially around an axis of the punches. The pitch of the adjacent annular convex portions or annular concave portions can be 1 to 6 times of the thickness of metal material. The annular convex portion and the concave portion preferably have an arch cross-section of which radius is 1 to 6 times of the thickness of metal material.

Also, the shape of press surface of the upper punch and lower punch used in the first press step are comprised of can be diverging convex portions and diverge concave portions diverging from the axis of the punches radially outwardly. An angle defined by the adjacent diverge convex portions on the upper surface or on the lower surface is preferably 10 to 30 degrees. The angle defined by the adjacent diverge convex portion on the upper surface and that on the lower surface is preferably smaller than 30 degrees.

The partially reinforcing apparatus according to the present invention is a press forming apparatus, and is comprised of one punch and other punch nipping and pressing the metal material, and a rotate means for rotating the one and other punches around the axis thereof.

EFFECT OF THE INVENTION

According to the present invention, by pressing the part of the metal material in two steps with exchanging the punches, the required part of the metal material can be reinforced. The partial reinforcing performed without using the material of high strength can contribute to decrease of material cost.

Also, by applying the partially reinforcing step of the present invention to the forming step of the forming body, quality of the pressed article can be improved without decreasing productivity. Especially, the present invention can be suitably used for the partial reinforcing of the suspension member which slides relative to the bushing of the upper arm or the lower arm.

PREFERRED EMBODIMENT OF THE INVENTION

Hereinafter, preferred embodiment will be explained with reference to attached drawings. However, noted that these embodiments are shown for the purpose of illustration only and not intended to limit the scope of the appended claims.

(Partially Reinforcing Method)

The partially reinforcing method of the present invention is comprised of (i) a first press step for generating a plastic strain by a plastic flow of metal material on a upper surface and/or a lower surface of the part to be reinforced, to form an upper convex-concave surface and/or a lower convex-concave surface; and (ii) a second press step for further generating the plastic strain by the plastic flow on the upper convex-concave surface and/or the lower convex-concave surface, to form an upper plane surface and/or a lower plane surface.

Figure 1:
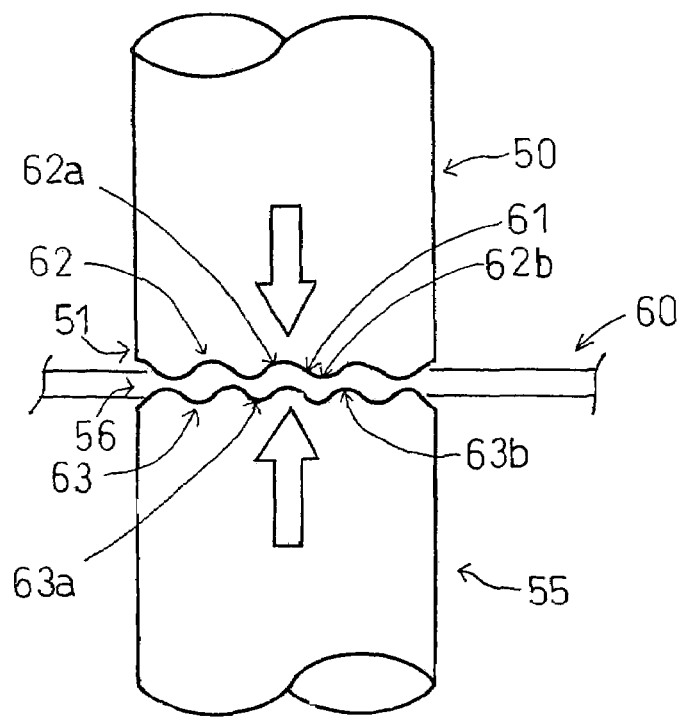
FIG. 1 is a schematic view showing the relation between the punches and the metal material in the first press step.

Firstly, in the first press step, as shown in FIG. 1, the reinforced part 61 of the metal material 60 requiring to be reinforced is pressed in the upper-lower direction by an upper punch 50 and a lower punch 55. The upper punch 50 has a press surface 51 of predetermined cross-section, and the lower punch 55 has a press surface 56 of predetermined cross-section. Generation of the plastic flow on the upper surface and the lower surface in the radius direction gives the plastic strain, so that an upper annular convex-concave portions 62 and a lower annular convex-concave portions 63 are formed on the metal material 60.

Next, the metal material 60 is put into the second press step classified into two types. In the first type, shown in FIG. 2, by an upper punch 70 having a plane press surface 71 and a lower punch 75 having a plane press surface 76, the static hydraulic pressure in the press direction A is applied to the upper annular convex-concave portions 62 and the lower annular convex-concave portions 63 formed in the first press step. Generation of the plastic flow of the metal material 60 in the circumferential direction further gives the strain to the upper surface and the lower surface, so that the reinforced part 61 can have far larger hardness than that of the surrounding portion.

Figure 2:
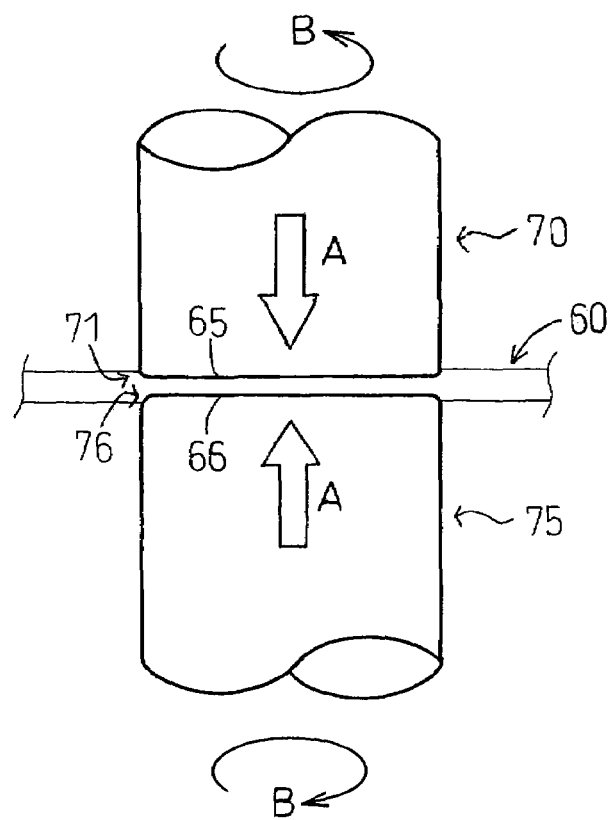
FIG. 2 is a schematic view showing the relation between the punches and the metal material in the second press step.

In the second type, not only the static hydraulic pressure shown by arrow A is applied by the upper punch 70 and the lower punch 75, but the upper punch 70 and the lower punch 75 are rotated in the opposite directions as shown by arrow B, as shown in FIG. 2. In this way, the shear force is given to the reinforced portion 61 to obtain the upper flat surface 65 and the lower surface flat 66.

Kind of the metal material to be reinforced by the present invention is not limited, as long as the work hardening occurs. For example, the iron such as a carbon steel or alloy steel, an aluminum, a magnesium or a copper used for the vehicle such as the automobile or industrial machine can be adopted.

Regarding the shape of metal material, a plate shape for the forming process is preferable, and preferable thickness thereof is 2 to 10 mm. When the thickness is smaller then 2 mm, dominant work hardening due to bending and return bending to the original shape makes the constant reinforcement difficult. To the contrary, thickness larger than 10 mm suffers from equipment restriction and is not practical. The thickness of 3 to 6 mm is more preferable.

Figure 10:
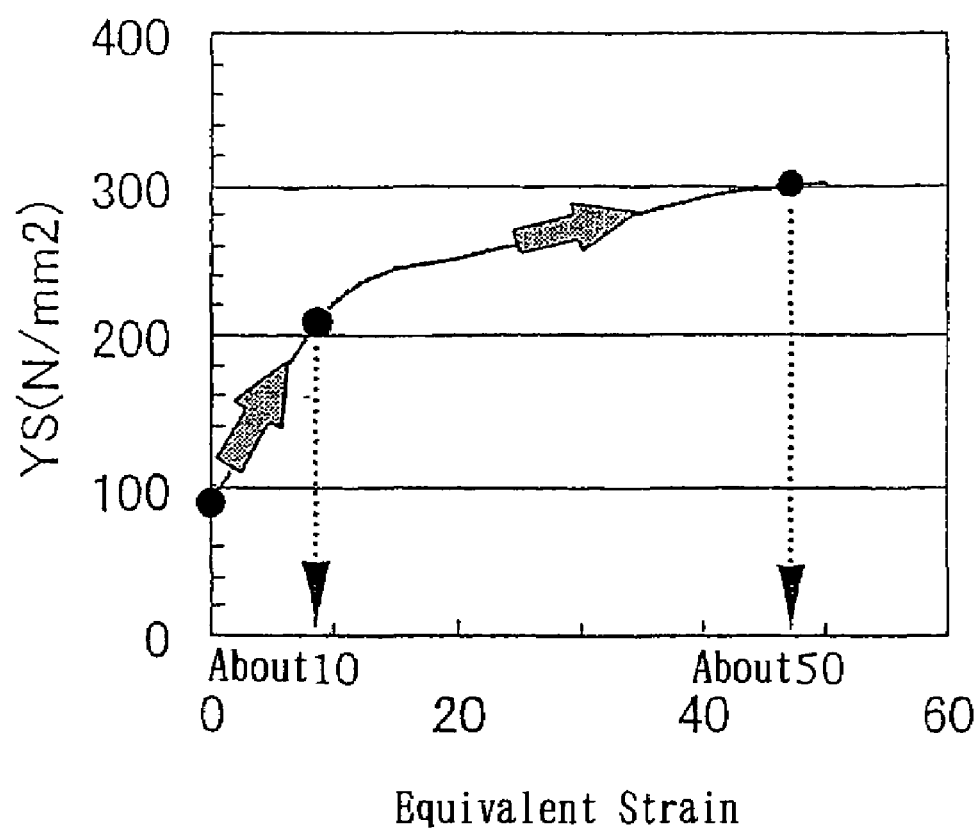
FIG. 10 is a graph showing one sample of the work hardening property of the aluminum alloy (JIS H4000 A5454P)

As the aluminum material, the plate material used for the suspension member of the vehicle can be illustrated. Material of 5000 series (JIS H4000) having the relatively high strength and excellent in the work hardening property can be preferably used. In view of the proportional relation of the reinforced portion hardness to the yield stress of the material having been subjected to the partial reinforcing, selecting the larger work hardening amount is desirable for increasing the limitive seat surface pressure proof. FIG. 10 shows one sample of the work hardening property of A5454P in which a lateral scale shows the equivalent strain, and a vertical scale shows YS.

Figure 6:
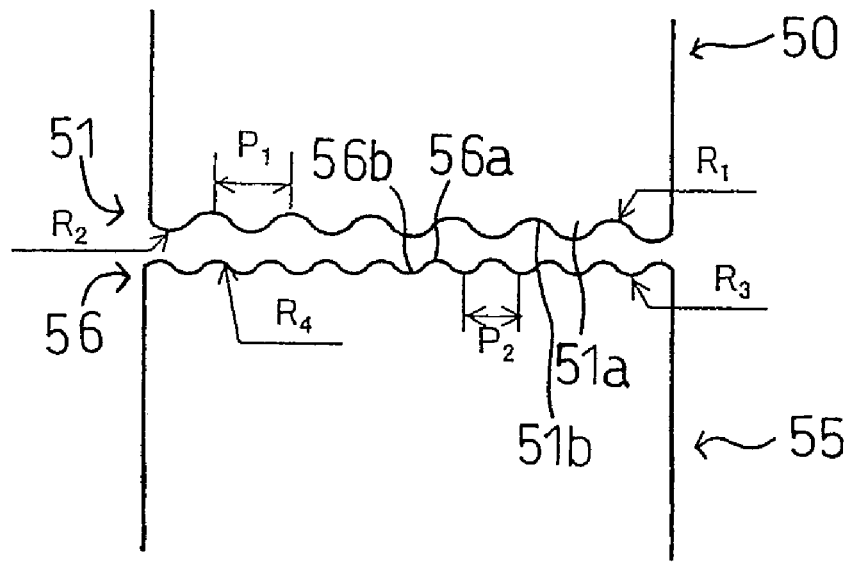
FIG. 6 is a schematic view showing a cross-section of the press surface of the punch used in the first press step.

The shape of the upper and lower convex-concave portion of the reinforced part 61 formed in the first press step is not limited. However, for the uniform reinforcement over the reinforced part 61, forming plural annular convex portions 62a and 63a, and plural annular concave portions 62b and 63b coaxially is preferable. These annular convex-concave portions can be formed by the upper punch 50 having the annular concave-convex press surface 51, and the lower punch 55 having the annular concave-convex press surface 56, as shown in FIG. 6.

Here, R1 is radius of the annular concave 51b, and R2 is radius of the annular convex 51a of the upper punch 50. R3 is radius of the annular concave 56b, and R4 is radius of the annular convex 56a of the lower punch 55. P1 is pitch of the adjacent annular concaves of the upper punch 50, and P2 is pitch of the adjacent annular concaves of the lower punch 55. The convex-concave press surfaces 51 and 56 can have the same shape, but shape similarity thereof is not essential.

The pitches P1 and P2 of the adjacent annular concave portions 51b and 56b are preferably 1 to 6 times of the metal material thickness. When the pitches P1 and P2 are smaller than the metal material thickness, the processing pressure in the second press step may be excessive. To the contrary, when the pitches P1 and P2 are larger than 6 times of the metal material thickness, sufficient work hardening becomes difficult.

The radii R1 to R4 of the annular convex portions in the first press step are preferably 1 to 6 times of the metal material thickness. When the radii R1 to R4 are smaller than the metal material thickness, processing pressure in the second press step may be excessive. To the contrary, when the radii R1 to R4 is larger than 6 times of the metal material thickness, sufficient work hardening becomes difficult.

Thus, the shapes of upper convex-concave press surface 51 and the lower convex-concave press surface 56 determined by the pitches P1 and P2, and the radii R1 to R4 can be selected, in view of the required reinforced amount (required strength) of the reinforced part 61 after the processing. That is, the shape of annular convex-concave portions 51a and 51b on the upper surface and the annular convex-concave portions 56a and 56b on the lower surface formed by the first press step is not necessarily identical with each other, but can be arbitrarily selected.

For example, the pitch of the annular convex-concave portions 51a and 51b can be selected longer (wider), while the pitch of the annular convex-concave portions 56a and 56b can be selected shorter (narrower). The annular convex-concave portion on the upper surface can have the depth different from that of the lower surface. Changing combination of the press surface shape of the punches 50 and 55 can give the strain resulted from the shear of metal material, or the strain resulted from the complex plastic flow resulted from the shear of metal material and the compressive deformation. Thus, the larger work hardening can be obtained in the second press step.

Figure 4:
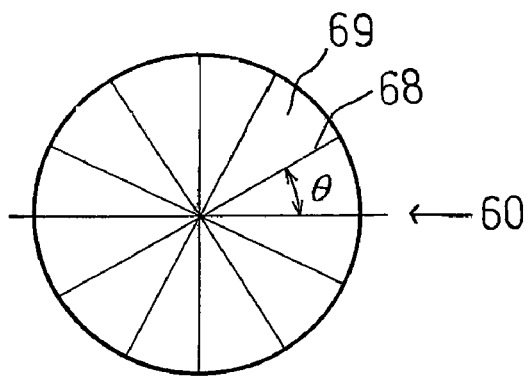
FIG. 4 is a the schematic view showing other sample of the head shape of the punch used in the first press step.
Figure 5:
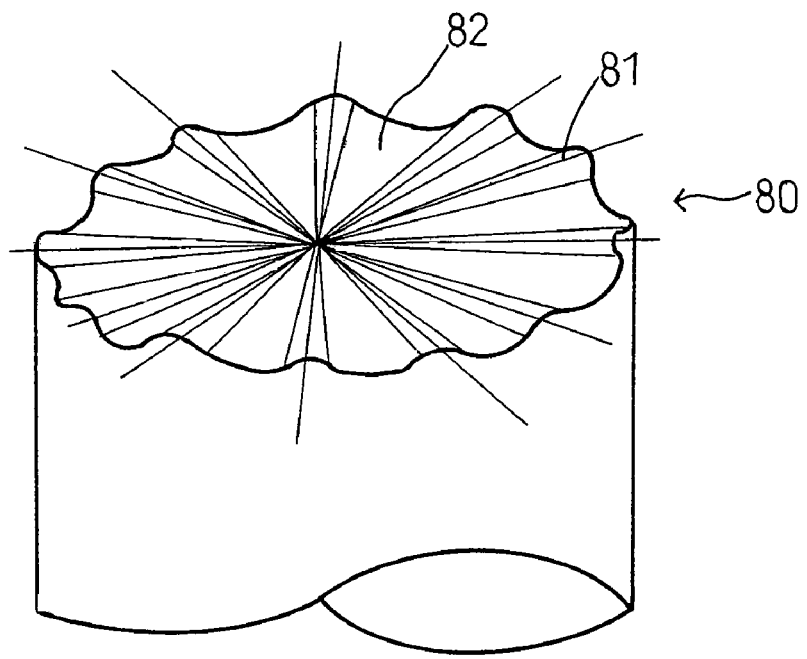
FIG. 5 is a perspective view showing an outline of the punch shown in FIG. 4.

Also, the convex-concave portions on the upper surface and the convex-concave portions on lower surface of the reinforced part in the first press step, can have the diverge shape diverging from the axis thereof. As shown in FIG. 4, the diverge shape includes plural diverge convex portions 68 and plural diverge concave portions 69. The diverge shape of the reinforced part correspond to the diverge shape of the punches, as shown in FIG. 5. The lower punch 80 is provided with the plural diverge press convexes 81 and plural diverge press concaves 82.

The convex portion 81 represented by the diverge lines at both sides preferably has fan shape, spreading from the center to the outer periphery. The angle defined by the adjacent diverge press convex portions 81 is preferably 10 to 30 degrees. When the angle is smaller than 10 degrees, the processing pressure in the second press step may be excessive. To the contrary, when the angle is larger than 30 degree, sufficient work hardening becomes difficult.

Figure 7:
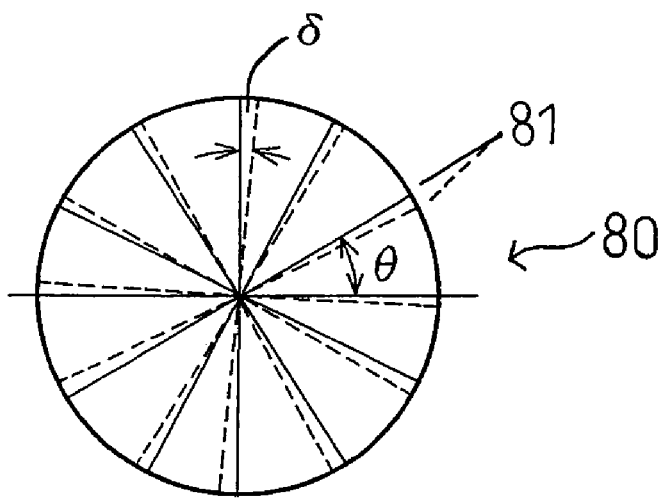
FIG. 7 is a schematic view showing the condition in which the punches having the diverge press surface are set in the first press step.

In this case, the upper press surface and the lower press surface (not shown) preferably have the same shape, and shifting the diverge convexes 81 of the both press surfaces by the angle δ as shown in FIG. 7 is preferable. Shifting the diverge convexes by the predetermined angle can generate the complex plastic flow due to both of the plastic strain resulted from the shear force and the compressive deformation. It contributes to the hardness increase due to the large work hardening achieved in the successive second press step. Here, the shift angle δ of the diverge convexes is preferably smaller than 30 degrees.

Using the punch having the first diverge press surface is especially preferable, when the second method in which the punch is pressed and rotated in the second press step is performed.

The press surface shape of the first press step is not limited to the annular shape or the diverge shape mentioned above. For example, a vortex shape can be adopted. The simple wave-shape can be adopted when the reinforced part is not circular shape. As the convex-concave shape, other than the annular circular shape, the annular trapezoidal or annular polygon shape can be adopted. Further, the upper press surface and the lower press surface can have different shape. For example, the former have the annular shape, while the latter has the diverge shape.

When once (single) pressing including the first press step and the second press step, is not sufficient to reinforce the reinforced part, twice or more pressing including the first and second press steps can be repeated for the same reinforced part.

Applying the partially reinforcing method of the metal material of the present invention to the forming step which forms the metal material to the formed body, can partially reinforce the required part, without increasing the number of total press steps. For example, the first press step of the present invention can be applied to the press step for blanking the metal material, so that the convex-concave portions are formed on the both surfaces of the reinforced part simultaneous with the blanking. Then, the second step of the present invention can be incorporated into the forming step, so that the convex-concave portions of the reinforced part is planed simultaneously with forming of the formed body.

(Partially Reinforcing Apparatus)

As mentioned above, the partially reinforcing method of the present invention can achieve the first step by the normal forming press, with using the first set of upper and lower punches 50 and 55, or 80 etc. having the annual or diverge convex-concave press surfaces 51 and 56 suitable for the partial reinforcing. Then, it achieves the second press step after exchanging the first set of punches to the second set of punches 70 and 75 having the flat press surface 71 and 76, so that only the limited portion of the metal material is work hardened. Accordingly, in this first method, the normal forming press can be used as the partially reinforcing apparatus, for the first and second press steps.

It is noted in the second method of the second press step, the static hydraulic pressure in the press direction and the shear force in the direction orthogonal thereto are given to the metal material, to form the upper and lower planes. For this reason, the normal pressing apparatus can not be used.

In the following, the partially reinforcing apparatus for achieving the second method of the second press step will be explained. This partially reinforcing apparatus is the press forming apparatus of the metal material, and is comprised of an upper punch and a lower punch nipping and pressing the metal material, and a rotate means for rotating the punches about the axis thereof.

Figure 8:
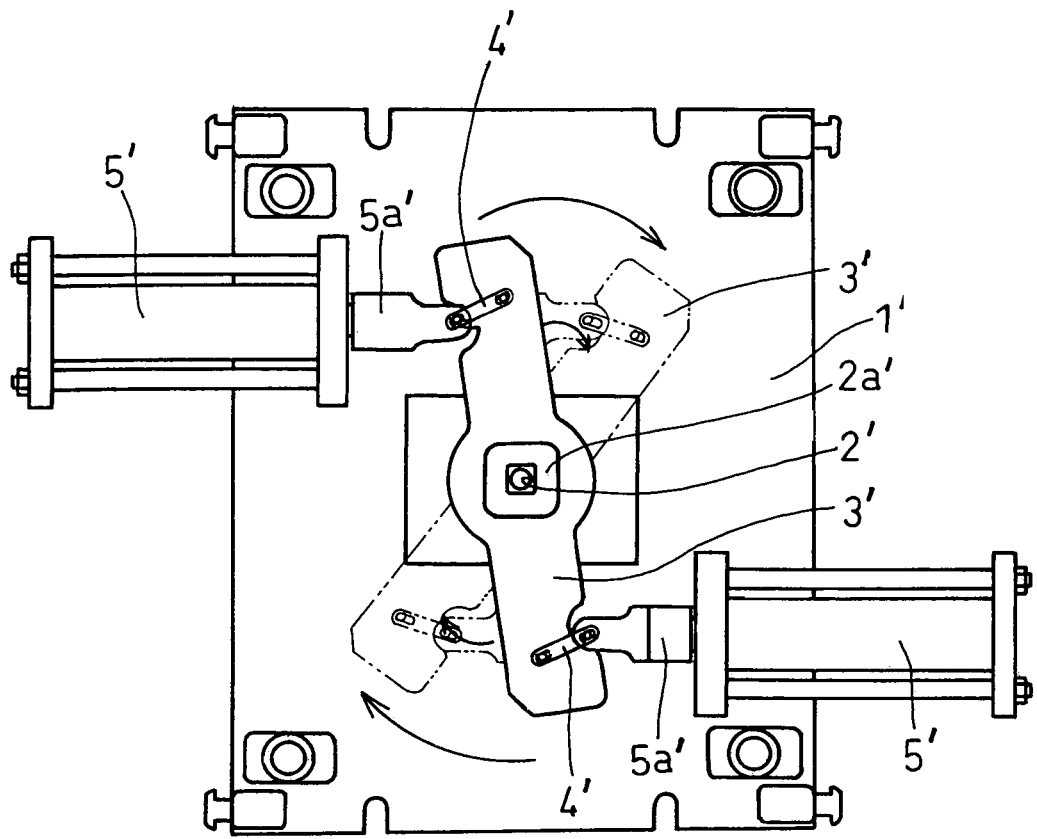
FIG. 8 is a plane schematic view showing a main portion of the lower mold of the partial reinforcing apparatus having the rotate means for applying the shear strain to the punch in the second press step.
Figure 9:
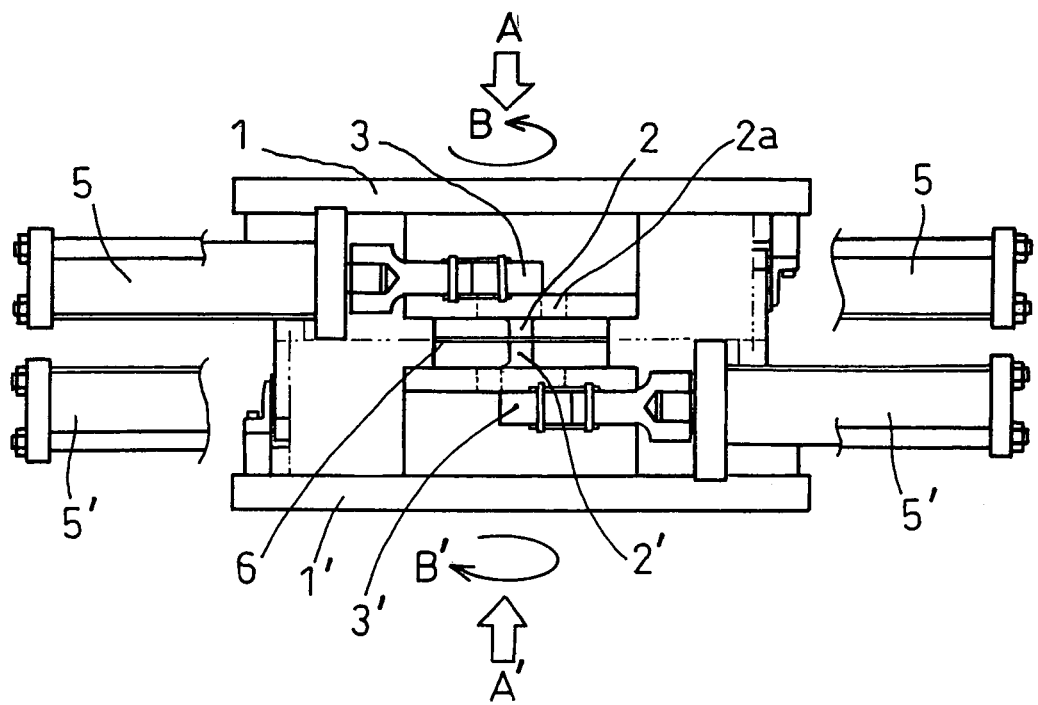
FIG. 9 is a side schematic view showing a main portion of the the partial reinforcing apparatus having the rotate means for applying the shear strain to the punch in the second press step.

A main portion of the partially reinforcing apparatus of the present invention is shown in FIGS. 8 and 9. FIG. 8 is the plane schematic view of the lower mold used in the second step, and FIG. 9 is the side schematic view of the upper mold and the lower mold. Apparently, the partially reinforcing apparatus is comprised of the upper half and the lower half having symmetrical construction, and constructing members of the lower half are added dash(') after the reference numerals.

In FIG. 8, a lower mold holder 1' holds a lower mold having a punch 2'. The lower punch 2' is rotated by a rotate member 3' engaged by engage portion 2a' about the axis thereof. The both ends of the rotate member 3' are engaged with cylinders 5' via engage members 4' to be rotated by extension and the shrink of the cylinder head 5a'. By operation of the cylinder 5' with the hydraulic device (not shown), the cylinder head 5a' protrudes to rotate the rotate member 3' to the position shown by the dotted line. Together with the rotate member 3', the lower punch 2' also rotate. Here, combination of the cylinders 5', engage members 4', rotate member 3 and the hydraulic device is called "rotate means". The lower punch 2' corresponds to the above-mentioned lower punch 75, and the upper punch 2 corresponds to the upper punch 70.

As shown in FIG. 9, the reinforced part of the metal material 6 is nipped between the upper punch 2 and the lower punch 2' and the press loads are applied in the directions A and A'. Simultaneously, rotating the upper and lower rotate members 3 and 3' rotates the upper punch 2 and the lower punch 2' in the directions B and B' respectively, to give the horizontal shear forces on the upper and lower surfaces of the reinforced part. Here, the lubricant oil such as mine oil is preferably supplied into the gaps between the reinforced part 6 and the punches 2 and 2'. By giving the shear strain parallel to the surfaces of metal material can generate the effect same as the first method of the second press step, with the relatively low force.

EXPERIMENT

Figure 3:
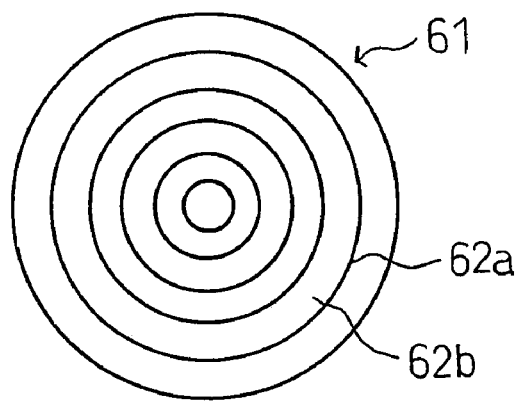
FIG. 3 is a schematic view showing one sample of the head shape of the punch used in the first press step.

As the test piece, the aluminum alloy plate (JIS H4000 A5454P-$H_{112}$) having thickness of 3.5 mm is used. Only to the circular area within diameter of 40 mm on the test piece, the partial reinforce treatment is applied. The upper and lower punches used in the first step have the annular convex-concave press surface shown in FIG. 3. On the press surface of the upper punch shown in FIG. 6, the pitch P1 is 10 mm, radius R1 is 5 mm and R2 is 5 mm, while the pitch P2 is 8 mm, radius R3 is 4 mm and R4 is 4 mm on the press surface of the lower punch.

Figure 11:
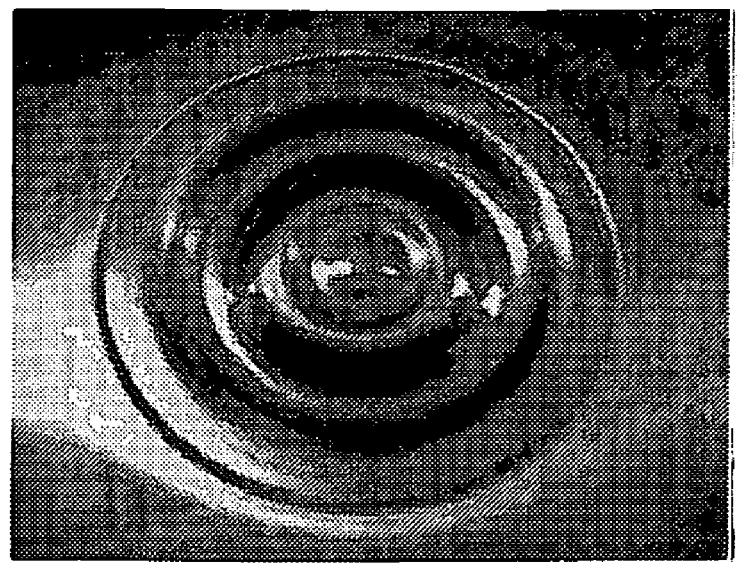
FIG. 11 is a photograph showing the plane condition of the partially reinforced portion after the first press step.

As the pressing conditions, pressure of 800 MPa and the press time of 1 sec. are adopted. The upper surface state of the partially reinforced part after the first press step is shown in FIG. 11.

In the second press step, the part on which the annular convex-concave portions 62, 63 are formed coaxially in the first step is nipped and pressed by the upper and lower punches 70 and 75 having the flat press surfaces 71 and 76. Thus, the convex-concave parts 62, 63 are flattened to planes 65 and 66. As the pressing conditions, the pressure of 800 MPa and the press time of 1 sec. same as that of the first press step are adopted. However, no shear strain in the plane direction is applied.

Figure 12:
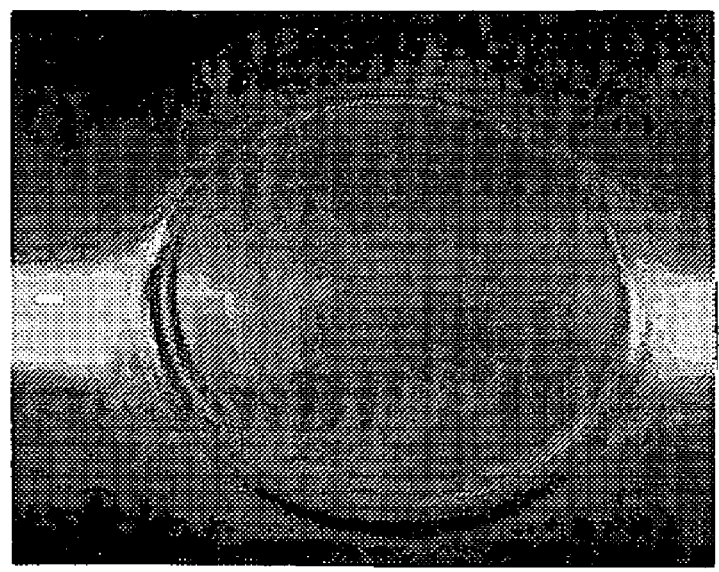
FIG. 12 is a photograph showing the plane condition of the partially reinforced portion after the second press step.

The upper surface state of the partially reinforced part after the second press condition is shown in FIG. 12. The thickness of partially reinforced part subjected to the second press step is about 3 mm.

Figure 13:
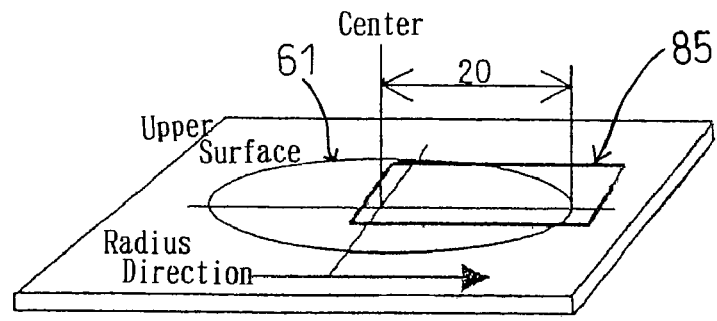
FIG. 13 is an explanatory view showing the cut-out position of the test piece for the hardness measuring in the partially reinforcing portion.
Figure 14:
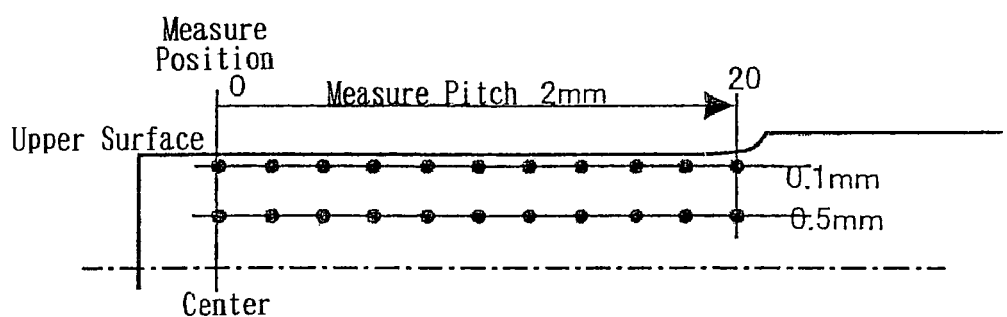
FIG. 14 is an explanatory view showing the hardness measuring position of the partially reinforcing portion.

The hardness of partially reinforced part after the second press step is measured. As shown in FIG. 13, the rectangular test piece 85 for the hardness measurement is cut out from the circular reinforced part 61. As shown in FIG. 14, hardness is measured in the cross-section of the partially reinforced part along the radius direction of the test piece 85.

In the cross-section, the Vickers hardness (load is 50 g) at every measure point of 2 mm interval at the depth of 0.1 mm and 0.5 mm from the surface of the test piece is measured. Thus, at each depth, the eleven values of hardness along the center to the periphery are obtained. Result thus obtained are shown in FIG. 15.

Figure 15:
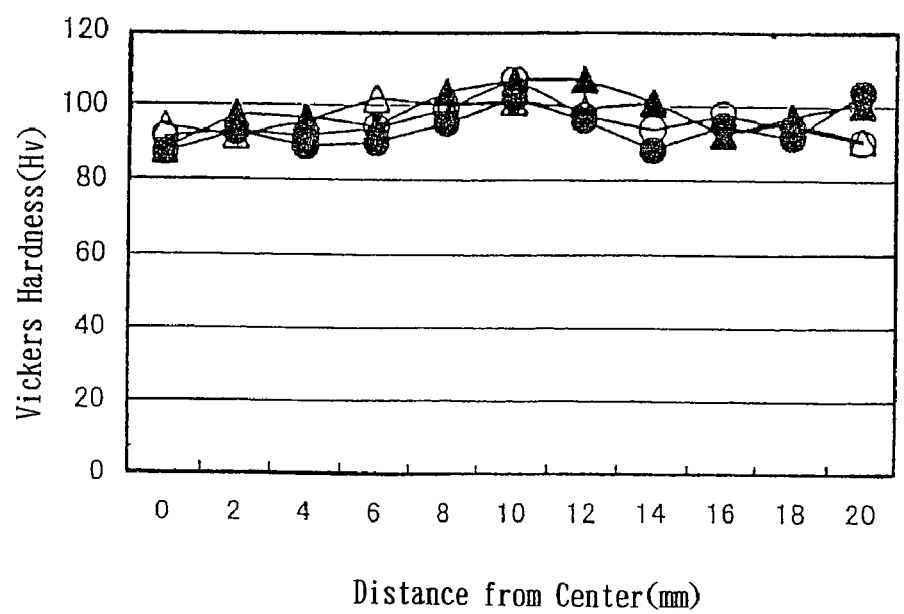
FIG. 15 is a graph showing the hardness change depending on the distance from the center of partially reinforcing part.

In FIG. 15 in which the lateral scale shows a distance from the center, and the vertical scale shows the Vickers hardness, the mark of ● and ○ respectively show a hardness distribution at the 0.1 mm depth point and 0.5 mm depth point from the upper surface of the partially reinforced part. On the other hand, mark of ▲ and △ respectively show a hardness distribution at the 0.1 mm depth point and 0.5 mm depth point from the lower surface of the partially reinforced part.

As apparent, the test piece 85 having been subjected to the partial reinforcing has the Vickers hardness Hv ranging from 84 to 110 at all measured points. Hardness slightly varies in the radius direction, but does not vary in the depth direction. Meanwhile, the Vickers hardness Hv of the test piece not subjected to the partial reinforcing ranges from 60 to 68.

The test piece 85 is made of the metal material same as that of the suspension member, and is supposed to have the slide surface sliding relative to the bushing the upper arm and the lower arm. Assuming the limitive seat surface pressure at this portion is about 150 N/mm$^2$, the slide surface having the Vickers hardness Hv larger than 84 can satisfy this limitive seat surface pressure. In this way, the desired forming material having sufficient hardness and excellent in the forming property can be obtained.

What is claimed is:

1. A partial reinforcing method for reinforcing a part of a metal material, comprising:
   a first press step for generating a plastic strain by a plastic flow of metal material on a front surface and a rear surface of the part to be reinforced, to form a front convex-concave surface and a rear convex-concave surface; and
   a second press step for further generating the plastic strain by the plastic flow on the front convex-concave surface and the rear convex-concave surface, to form a front plane surface and a rear plane surface;
   wherein said second press step simultaneously gives the metal material a static hydraulic pressure in a press direction and a shear force in a plane direction, upon forming of the front plane surface and the rear plane surface;
   and further wherein in said second press step, a front punch and a rear punch are rotated in opposite directions to give the shear force.

2. A partial reinforcing method according to claim 1, wherein the metal material is an aluminum alloy.

3. A partial reinforcing method according to claim 1, wherein the metal material has thickness of 2 to 10 mm.

4. A partial reinforcing method according to claim 1, wherein each of a front punch and rear punch used in the first press step has a press surface on which plural annular convex-concave portions are formed about an axis thereof coaxially.

5. A partial reinforcing method according to claim 4, wherein a pitch of the adjacent annular concave or concave portions is 1 to 6 times of thickness of metal material.

6. A partial reinforcing method according to claim 4 or 5, wherein the cross section of annular convex portion and annular concave portion is comprised of an arch of which radius is 1 to 6 times of the thickness of metal material.

7. A partial reinforcing method according to claim 1, wherein each of a front punch and a rear punch used in the first step has press surface on which plural diverge convex-concave portions diverging from an axis thereof are formed.

8. A partial reinforcing method according to claim 7, wherein an angle defined by adjacent convex portions is 10 to 30 degrees.

9. A partial reinforcing method according to claim 7, or 8, wherein the angle defined by the convex portion on the front surface and the convex portion on the rear surface is smaller than 30 degrees.

10. A partial reinforcing method for reinforcing a part of a metal material, comprising:
- a first press step for generating a plastic strain by a plastic flow of metal material on a front surface or a rear surface of the part to be reinforced, to form a front convex-concave surface or a rear convex-concave surface; and
- a second press step for further generating the plastic strain by the plastic flow on the front convex-concave surface or the rear convex-concave surface, to form a front plane surface or a rear plane surface;
- wherein said second press step simultaneously gives the metal material a static hydraulic pressure in a press direction and a shear force in a plane direction, upon forming of the front plane surface and the rear plane surface;
- and further wherein in said second press step, a front punch and a rear punch are rotated in opposite directions to give the shear force.

11. A partial reinforcing apparatus for reinforcing a part of a metal material, comprising:
- a front punch having a planar press surface and a rear punch having a planar press surface nipping and pressing the metal material, said front punch and rear punch having annular convex portions and annular concave portions to generate strain in the metal material and form front and rear convex surfaces; and
- a rotating means for rotating the front punch and the rear punch in opposite directions about an axis thereof, respectively, to thereby give the metal material a static hydraulic pressure and a shear force.

* * * * *

UNITED STATES PATENT AND TRADEMARK OFFICE
CERTIFICATE OF CORRECTION

PATENT NO. : 7,240,529 B2 Page 1 of 1
APPLICATION NO. : 10/782759
DATED : July 10, 2007
INVENTOR(S) : Hirotaka Todaka et al.

It is certified that error appears in the above-identified patent and that said Letters Patent is hereby corrected as shown below:

Claim 9, col. 9, line 4, "claim 7, or 8," should read --claim 7 or 8,--.

Signed and Sealed this

Sixteenth Day of October, 2007

JON W. DUDAS
*Director of the United States Patent and Trademark Office*